United States Patent [19]

Mandt

[11] 4,206,047
[45] Jun. 3, 1980

[54] MULTI-STAGE SYSTEMS FOR WASTE WATER OXIDATION

[75] Inventor: Mikkel G. Mandt, Cedar Falls, Iowa

[73] Assignee: Houdaille Industries, Inc., Fort Lauderdale, Fla.

[21] Appl. No.: 924,187

[22] Filed: Jul. 13, 1978

[51] Int. Cl.² .............................................. C02C 1/06
[52] U.S. Cl. .................................... 210/7; 210/14
[58] Field of Search ................ 210/3, 4, 7, 14, 15, 210/195.5, 199

[56] References Cited

U.S. PATENT DOCUMENTS

| | | |
|---|---|---|
| 3,547,812 | 12/1970 | McWhirter ............................. 210/7 |
| 3,547,815 | 12/1970 | McWhirter ............................. 210/7 |
| 3,725,258 | 4/1973 | Spector et al. ......................... 210/7 |
| 3,864,246 | 2/1975 | Casey et al. ........................... 210/7 |
| 4,081,386 | 3/1978 | Block et al. ........................ 210/7 X |

Primary Examiner—Thomas G. Wyse
Attorney, Agent, or Firm—Fitch, Even Tabin

[57] ABSTRACT

Methods of the activated sludge type for treating sewage utilizing specific mixing regimes and oxygen demand rates. The systems are particularly advantageous in utilization of relatively pure oxygen in a final stage treatment zone, and in which no more than 10% of the total oxygen requirement for all zones is required for high purity oxygen.

16 Claims, 4 Drawing Figures

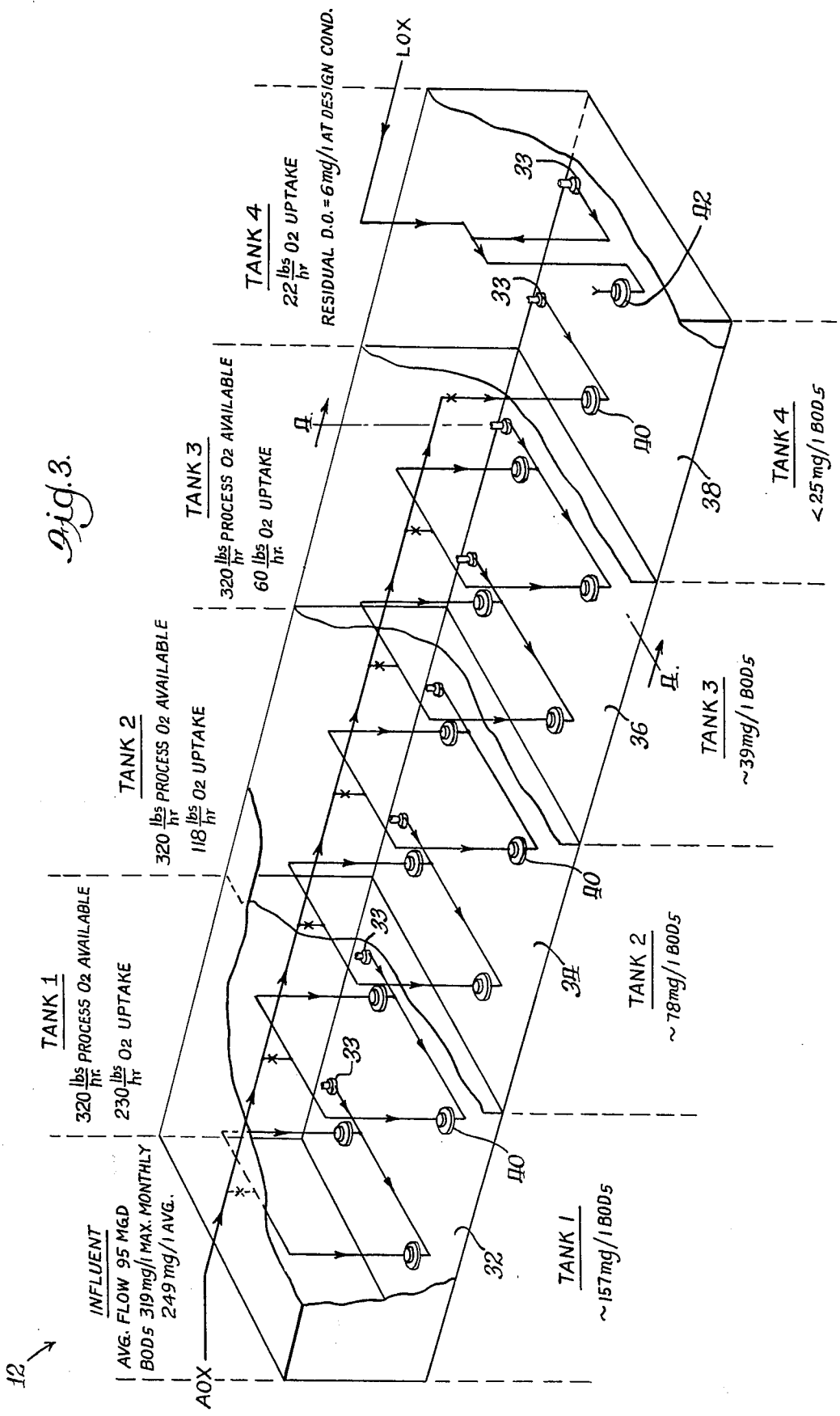

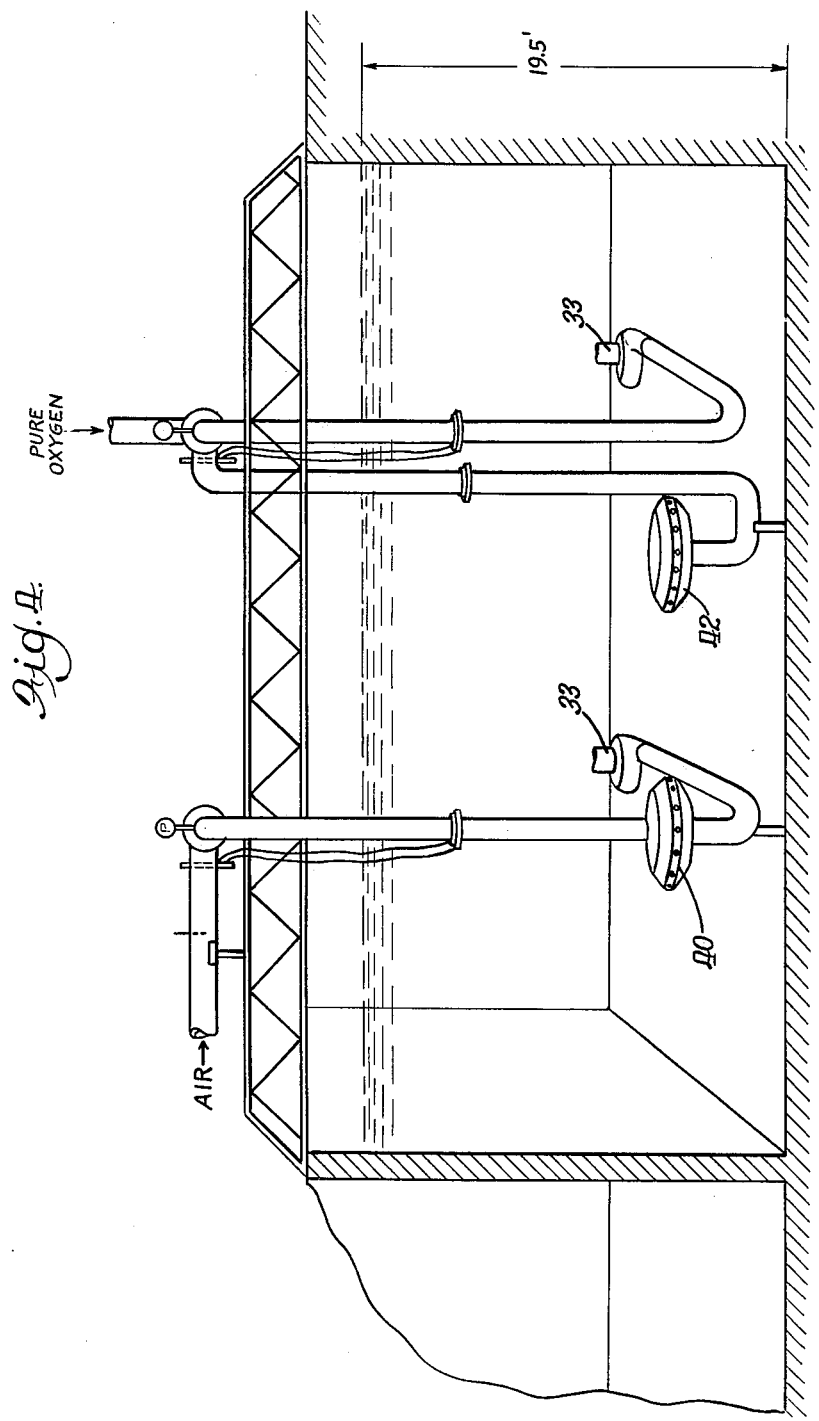

MULTI-STAGE SYSTEMS FOR WASTE WATER OXIDATION

The present invention is directed to water treatment systems, and, more particularly, is directed to aerobic activated sludge treatment system for waste water such as sewage.

The accelerating necessity for protection of the environment has emphasized the need for development of technology to aid in pollution control, such as waste water treatment technology. The use of oxygen in place of air in activated-sludge processes is one development in respect of aerobic, activated sludge wastewater treatment technology. In conventional oxygen treatment systems, high-purity oxygen is used as the source of oxygen for the microorganisms in an aeration basin, as opposed to using air as the oxygen source as is done in various other types of conventional activated sludge systems.

Figure 1:
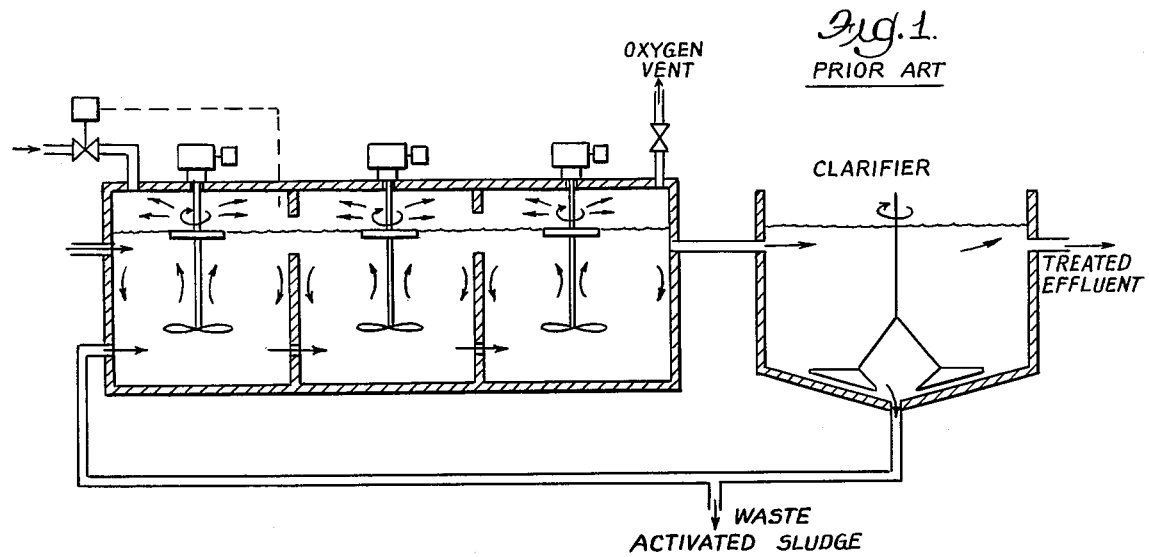

Conventional oxygenation systems may use a covered and multi-staged oxygenation basin for contact of oxygen gas and mixed liquor. High-purity oxygen (e.g., 90–100 percent oxygen by volume) enters the first stage of the system and flows concurrently with the waste water being treated through the oxygenation basin system as shown in FIG. 1. The gas pressure in conventional oxygen systems is essentially atmospheric, but is used to maintain control and prevent backmixing from stage to stage. Effluent mixed liquor from the oxygenation basin system outlet is separated in conventional gravity clarifiers, and the thickened sludge is recycled to first stage for contact with influent waste water.

Mass transfer and mixing within each stage of conventional oxygen systems is accomplished either with surface aerators or with a submerged-turbine rotating-sparge system. In the case of surface aerators, mass transfer occurs in the gas spaces of the closed tanks. In the case of submerged turbine spargers, gas is sparged into the mixed liquor where mass transfer occurs from the gas bubbles to the bulk liquid. In both cases, the mass-transfer process utilizes the high oxygen-partial pressure maintained under the tank covers in each stage. As a consequence of the increased oxygen-partial pressure, it is feasible to maintain higher dissolved oxygen (DO) levels in the mixed liquor relative to those achievable in such apparatus with air. Thus, the effective transfer efficiency of a mass-transfer device in oxygen service will be greater than its standard transfer efficiency, whereas the opposite is true with the same device operating in air.

The selection of the number of stages, the number of parallel biological reactors, and the type of mass-transfer device to employ are variables that depend on waste characteristics, plant size, land availability, treatment requirements, and other similar considerations in accordance with conventional practice.

Technical literature reviews have reported that parameters such as solids settleability, thickening and dewatering, treatment capacity and effluent quality, substrate utilization rates of activated sludge produced, and waste sludge capacity of pure oxygen vs. air activated sludge systems may be generally comparable and that these parameters may not be substantially affected by high DO levels. [Kalinske, A. A., "Comparison of Air and Oxygen Activated Sludge Systems", *JWPCF,* 48, 2472, 1976; Benefield, L. D., et al., "The Effect of High Purity Oxygen on the Activated Sludge Process", *JWPCF,* 49, 269, 1977; see also A. J. Engande, et al., "Oxygen Concentrations and Turbulence as Parameters of Activated Sludge Scale-Up", Water Resources Symposium No. 6, Center for Research in Water Resources, University of Texas at Austin, 1973; J. E. Ball, et al., "Comparison of Air and Oxygen Activated Sludge Kinetics and Settleability", Water Resources Symposium No. 6, Center for Research in Water Resources, University of Texas at Austin, 1973].

However, the maintenance of high dissolved oxygen (DO) levels in the mixed liquor is also said in the literature to contribute to a highly aerobic biological mass that flocculates well and has enhanced settling characteristics relative to air systems, so that a relatively high level of mixed liquor suspended solids (MLSS) (e.g., 4,000–8,000 mg/l) can be carried in the pure oxygen biological reactor system. High DO levels are also reported to contribute to lower excess solids production than is commonly achieved with various conventional air-activated sludge systems at comparable biomass loadings ["Oxygen Activated Sludge Waste Water Treatment Systems", Environmental Protection Agency Technology Transfer Seminar Publication 1973)].

However, because conventional covered oxygen systems require the availability of high-purity oxygen gas in large quantities, such systems generally include expensive large-tonnage cryogenic air-separation installations to produce high-purity oxygen gas. Such cryogenic installations are complicated, expensive to build and expensive to operate. Such costs are a substantial disadvantage for oxygen systems.

Figure 2:
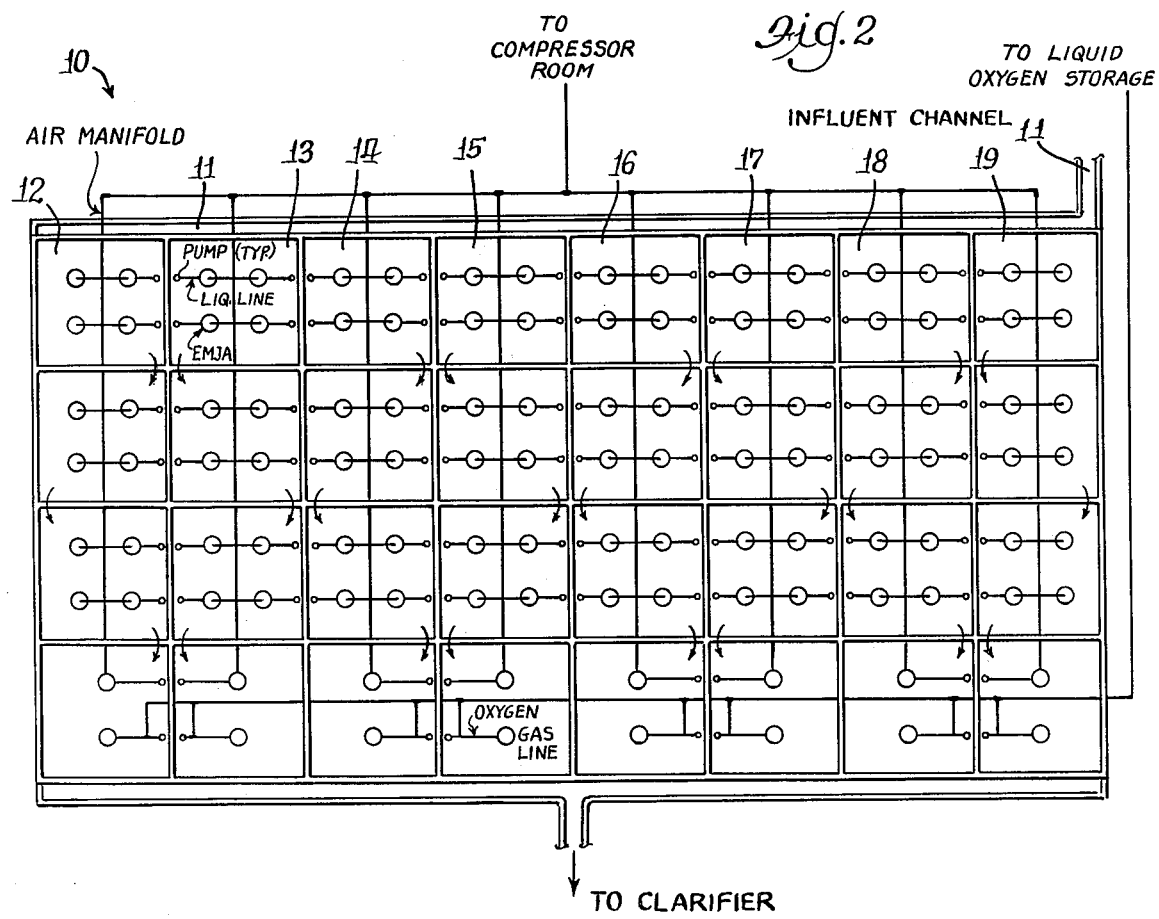

Accordingly, it is an object of the present invention to provide improved aerobic waste water treatment systems of the pure oxygen type, which do not require high volume utilization of pure oxygen. It is a further object of the invention to provide such improved aerobic waste treatment systems which produce a high DO system effluent. These and other objects of the present invention will become apparent from the following drawings, of which:

FIG. 1 as previously referred to, is a schematic illustration of a conventional oxygen sewage treatment system, FIG. 2 is a top view of an embodiment of an aerobic treatment system in accordance with the present invention, FIG. 3 is a perspective view of one aeration basin train of the system of FIG. 2, and FIG. 4 is a cross-sectional view, partially broken away of one of the tank rows of the aeration basin section of FIG. 3.

Generally, aeration systems in accordance with the present invention include aeration basin means for aerobic activated-sludge treatment of sewage influent, comprising a staged plurality of complete-mix aeration tanks having different levels of treatment parameters. Further in accordance with the invention, a plurality of serially connected activated sludge aeration zones is desirably provided each of which utilizes air as the oxygen source, and a final aeration activated sludge zone is provided which may utilize relatively pure oxygen (i.e., at least 80% and preferably at least 90% oxygen by volume) as an oxygen source.

In operation, the raw or pretreated sewage is introduced into the staged aeration zones and subjected to staged mixing and oxygenation conditions such that at least 80% of the oxygen utilized in aeration treatment of the influent in passing through the system is provided in the form of atmospheric oxygen, with the remainder being provided in the form of relatively pure oxygen. The oxidation is carried out in at least two treatment zones, comprising an initial zone or zones and a final zone. The initial zone(s) provides conditions of high rate mixing and oxygenation with atmospheric oxygen (air) to treat the predominant portion of the biological oxygen demand of the influent, while the final zone provides conditions of low rate mixing and oxygenation with relatively pure oxygen, and relatively high dissolved oxygen content. The retention time of $\theta$ of the initial zone(s) (i.e., the zone fluid volume divided by the treatment flow rate) should be limited such that the oxygen uptake rate, U, within the first treatment zone is at least 20 mg of oxygen per liter hour of zone fluid volume, and an oxygenation intensity of equal or greater magnitude is provided (equal to or greater than the oxygen uptake rate, U, within this first treatment zone) so that the treatment zone is not oxygen limited. As indicated, the initial zone(s) will have high oxygenation rate, high oxygenation intensity conditions with relatively high mixing rate as indicated by a mean velocity gradient $\overline{G}$ greater than about 100 seconds$^{-1}$. Further in this connection, the energy dissipation rate E ($E = P/\forall$ where P is the power transferred to the zone liquid and $\forall$ is the zone volume) should be greater than about 100 horsepower per million gallons of zone volume (Hp/MG). The mixing intensity in the initial zone accordingly provides effectively homogenous atmospheric oxygen aeration conditions which are neither aeration nor growth limited. The mixed liquor in the initial tanks or zones is subjected to such conditions of vigorous mixing and aeration with atmospheric air, under sufficient hydraulic retention time conditions that the BOD$_5$ of influent passing through the initial air treatment zone(s) is reduced by at least about 90%. Generally, the hydraulic retention time of the initial zone(s) should be in the range of from about 65% to about 95% of the total hydraulic retention time of the initial and final zones. More specifically, the hydraulic retention time of the initial zone(s) should best be about 3.5 hours or less.

The mixed liquor influent to the final aeration treatment zone, as indicated, retains less than about 10 percent of the BOD$_5$ of the raw influent to the initial zone, and will desirably have a BOD$_5$ of about 50 mg/liter or less in the treatment of normal types of municipal waste water. The final basin utilizes relatively pure oxygen for mixed-liquor aeration, and is desirably maintained at a relatively high dissolved oxygen content of at least about 3 mg/liter, velocity gradient $\overline{G}$ of less than about 100 seconds$^{-1}$, and preferably under mean velocity gradient conditions of from about 40 to about 60 seconds$^{-1}$. The energy dissipation rate E in the final oxygenation zone will generally be less than about 60 Hp/MG.

The final aeration zone utilizing pure oxygen as an oxygen source provides a mixed liquor effluent having a BOD$_5$ of less than about 30 mg/liter for normal municipal waste water treatment and having a dissolved oxygen content of at least about 3 mg/liter. The hydraulic retention time of the final oxygenation zone should be from about 5 to about 35% of the total hydraulic retention time of the total aeration zone system. More specifically, the retention time of the final zone should best be in the range of from about 12 to about 60 minutes.

The mean velocity gradient G of the initial and final zones previously referred to may be represented as:

$$\overline{G} = \sqrt{\frac{P}{\mu \forall}}$$

where P is the power transferred to the liquid in foot-pounds per second, $\mu$ is the dynamic viscosity of the liquid in pound-seconds/ft$^2$, and $\forall$ is the liquid volume of the aeration zone or basin in cubic feet. The power P transferred to the liquid may be determined according to conventional practice, and in this connection, for example, the power P (including its components if multiple power sources are present) may be determined from various readily measurable operating parameters of the apparatus utilized for oxygenation and/or mixing in the aeration zone.

For example, the power P$_{pump}$ (due to liquid pumping) and the power P$_{air}$ (due to adiabatic expansion) introduced by a gas-liquid contactor of the jet aeration type may be represented as:

$$P_{pump} = Q \rho g h$$

where
Q is the liquid flow rate,
$\rho g$ is the weight density of pumped fluid and
h is the head loss $$\left( P_{pump} \text{ for water} = \frac{gpm \times \text{head (ft)}}{7.2} \right)$$
(in ft-16/sec)

$$P_{air} = 81.5 Q_a \log((h+34)/34)$$

where
Q$_a$ is the air flow in cfm, and
h is the depth of gas release, ft

Likewise the power P$_{air}$ from an air-only diffusion system would consider only the P$_{air}$ power above and not the P$_{pump}$ power. Similarly, the power P$_{impeller}$, for example from a turbine mixer, may be represented as:

$$P_{impeller} = \tfrac{1}{2} C_D \rho A v^3 \text{ (i.e., turbine, etc.)}$$

where
C$_D$ is the drag coefficient (e.g., $\approx 1.8$ for flat paddles)
$\rho$ is the fluid density,
A is the area of impeller blade perpendicular to motion, and
v is the relative velocity of impeller and the fluid ($\approx 0.5$ to 0.75 times impeller velocity) (tip speed)

The mixing and oxygen introduction in the treatment zones is preferably accomplished through the use of gas-liquid contacting means for utilizing a pressurized liquid source to provide gas-liquid mixing energy to transfer oxygen into the mixed liquor and to mix the aeration zone to maintain the mixed liquor solids in suspension. Such gas-liquid contacting means will also generally utilize a pressurized oxygen source, which is either air or relatively pure oxygen, as will be explained in more detail hereinafter. Gas-liquid contacting means which provide a jet of intimately mixed gas and motive liquid are particularly adapted for tank mixing and oxygenation efficiency, and such contactors which provide a linear or radial array of gas-liquid jets adjacent the bottom of the aeration zone are particularly desirable, such as those described in U.S. Pat. Nos. 3,897,000 and 3,951,344. The gas-liquid contactors should best be capable of operating in the aeration zone at an oxygenation efficiency of at least about 2 pounds of dissolved oxygen per horsepower-hour of energy supplied to the gas-liquid contactor, and more preferably, at least about 3 pounds per hp-hr. for air as the oxygen source. The gas-liquid contactors for pure oxygen introduction should best have an oxygenation efficiency of 6 pounds per hp-hr. Moreover the aeration system must have the capability of providing a specific oxygenation intensity, $R_o$, equal to or greater than the oxygen uptake rate (20 mg/l-hr or greater) and mixing must be adequate to insure no portion of the treatment zone(s) is oxygen limiting.

In such systems, power is supplied as motive stream and gas input pressure to the gas-liquid contactors under flow conditions, and the oxygenating capacity may be maximized for jet aerators at a particular air-liquid flow ratio. In accordance with conventional practice, the aeration basin design may be such that aeration basin mixed liquor is recirculated through gas-liquid contactors by pumps, which provide a predetermined degree of mixing intensity. Compressed air may be introduced to the aeration basin stages by means of the gas-liquid contactors, in which higher pressured mixed liquor entrains the air and discharges the mixture through the jet nozzles. The result is extremely efficient oxygen transfer due to the very small bubble size and longer bubble detention time in the basin. The amount of oxygen supplied to the basin can be monitored and controlled for optimum power usage. [Huang, J. Y. C. and M. G. Mandt, "Jet Aeration Theory & Application", presented at the 28th Industrial Waste Conference, Purdue University, Lafayette, Ind., 1973].

In the final tank stage of each aeration basin train, gas-liquid contactors are supplied at least in part with relatively pure oxygen such as vaporized liquid oxygen (LOX) in lieu of atmospheric oxygen. The amount of such relatively pure oxygen introduced to the final basin can also be monitored and controlled to maintain optimum dissolved oxygen levels. Furthermore, as previously discussed, the mixing intensity in the final oxygen tank may be controlled to achieve optimum floc growth for settling in the final clarifier. Variable speed pumps may be used in the control of mixing intensity in the final basin.

The treated, high DO mixed-liquor effluent from the last aeration basin tank stage is conducted to a clarifier which provides return sludge component for return to the first aeration tank or zone, and clarified effluent.

Having generally described the invention, various features of the invention will now be more particularly described with regard to the embodiment 10 of sewage treatment apparatus illustrated in FIGS. 2 through 4.

FIG. 2 is a top view of the sewage treatment system 10, which comprises a plurality of staged sewage aeration trains 12, 13, 14, 15, 16, 17, 18, 19 into which raw or pretreated sewage influent may be introduced from influent channel 11. Each of the aeration trains comprises a plurality of treatment tanks or basins, as shown in more detail in FIG. 3, which is a perspective view of staged aeration tank train 12. Depending on the sewage influent flow rate, the influent may be directed to one or more of the aeration tank trains by means of suitable inlet gates from influent channel 11 to the respective adjacent tank units of the respective trains.

As shown in FIG. 3, the aeration tank train 12 comprises a plurality of tanks 32, 34, 36, 38, each of which is provided with gas-liquid contacting means for intimately dispersing air or oxygen in a liquid jetstream below the liquid surface of the tank. The illustrated gas-liquid contactors 40, 42 are model 200 JA eddy mix jet aeration cluster mixers as supplied by the Pentech Division of Houdaille Industries, Inc. Each of the tanks has a volume of 44,340 ft$^3$ (16.5' depth) to provide a hydraulic detention time of 0.665 hours at a design influent flow rate of 95 MGD (0.665×4 equals 2.66 hrs. for each train of four tanks or stages).

Sewage influent to be treated enters the upstream tank 32, and is subjected to complete-mix aeration conditions in the tank provided by a plurality of gas-liquid contactor modules 40 which are adapted to achieve intimate mixing of air with a fluid motive stream, and for maintaining effectively homogenous mixing conditions in the tank 32. In the illustrated embodiment 12, the gas-liquid contactors 40 are each circular in shape and comprise twelve radially directed, equally spaced jets. The jet gas-liquid contactor comprises an inner chamber to which a motive liquid (in this case mixed liquor from the tank 32, influent raw sewage, or both) is applied under pressure by means of a plurality of suitable mixed liquor recycle pumps 33. In the case of the air liquor contactors 40, the sewage motive liquid exits the inner chamber through an inner nozzle, and entrains air, which is provided under pressure in an outer chamber to provide an intimate air-liquid mixture. This mixture is then released, under pressure, to the aeration basin through an outer nozzle. This double nozzle arrangement provides very small bubbles and creates an "eddy mix" effect by turbulently rolling the mixed liquor in the aeration tank or basin 32. A plurality of the jet gas-liquid contactors 40 may be provided in the basin 32 to provide a predetermined degree of oxygen transfer and mixing, as will be discussed in more detail hereinafter.

As indicated, sewage pumps such as dry pit or submersible centrifugal pumps are utilized to deliver sewage influent, mixed liquor, or return of activated sludge to the jet gas-liquid contactors 40. Variable speed pumps may be used to control mixing intensity and bubble size and, utilimately, oxygen transfer. The pumps are matched to the jet gas-liquid contactors for optimum pressure and discharge parameters.

As also indicated, pressurized air is supplied to the gas-liquid contactors, and in this connection, air compressors such as positive displacement or centrifugal blowers are utilized to deliver the pressurized air to the jet gas-liquid contactors at the correct flow rate and pressure. Centrifugal blowers are preferred for higher oxygenation requirements and to provide for throttling capabilities, so that power consumption may be reducing during periods when oxygen demand is reduced.

In the illustrated embodiment (FIG. 2) three air compressors are utilized which are capable of delivering variable atmospheric oxygen flow rates of up to 1,490,000 pounds of oxygen per day.

The illustrated embodiment is adapted to accommodate an average influent flow of 95 million gallons per day (MGD) having a monthly maximum 5 day biological oxygen demand (BOD$_5$) of 319 mg/liter, and an average BOD$_5$ of 249 mg/liter. Each of the trains 12-19 are substantially identical in operation and capacity, and under full load conditions would each process one eighth of the influent. The following description of treatment train 12 may be applied equally to trains 13-19.

Raw influent and return sludge are introduced into the first tank 32 of the train 12 containing the mixed liquor of the activated sludge treatment process. The first aeration basin tank 32 of train 12 is adapted to provide the mixed liquor therein with an available process oxygen supply of 320 pounds per hour, with an oxygen uptake of 230 pounds per hour under conditions as will be further discussed. The mixed liquor in tank 32 is maintained in effectively homogenized mixing conditions by the fluid power input from the gas-liquid contactors 40. Each pair of the gas-liquid contactors is supplied with pressurized mixed liquor by means of a 32 HP pump 33 as shown in the drawings, and may be supplied with up to 100 HP of air (50 HP of air for each contactor 40). The mixed liquor in tank 32 is capable under the conditions stated to reduce the design $BOD_5$ level to about 157 mg/liter or less. The jet gas-liquid contactors 40 impart mixing energy with a horizontal component direction at the bottom level of the tank 32 with fine gas bubble rise throughout the basin, to provide rapid turnover of the mixed liquor and DO homogeneity. Also, surface spray and mist are substantially minimized. Dissolved oxygen homogeneity is important, as is sufficient mixing intensity. However, it should be noted that mixing intensity is reduced under high DO conditions near the end of the treatment train to allow better floc growth for settling while keeping the basin properly mixed so that the floc remains in suspension and adequate DO and DO homogeneity are maintained. This requires a high specific oxygenation capability which is provided by the aerobic treatment systems in accordance with the present invention. Mixed liquor from the first tank 32 of the aeration basin course 12 is conducted to the second tank 34 of the course. The aeration tank 34 is substantially like the first tank 32 in construction and similarly utilizes a plurality of gas-liquid contactors 40 which are substantially identical to those of tank 32.

The second tank 34 accordingly has a design process oxygen supply rate of 320 pounds per hour, like that of tank 32. However, the mixed liquor in the second tank 34 will reduce a substantially lower $BOD_5$ than the preceeding tank 32, which in the illustrated embodiment is to a $BOD_5$ of about 78 mg/liter, such that the design oxygen uptake rate it about 118 pounds per hour. As in the case of the influent tank 32, the motive stream energy input is utilized to provide effectively continuous mixing of the mixed liquor in the tank 34. Mixed liquor from tank 34 is conducted to a third serial treatment tank 36, which is similarly provided with gas-liquid contactors substantially identical to those of tanks 32, 34. Accordingly, a process oxygen supply rate of 320 pounds of oxygen per hour is provided to tank 36. However, the oxygen uptake rate in the illustrated embodiment, in view of the previous oxygenation treatment provided in tanks 32, 34 is about 60 pounds per hour in the illustrated embodiment, which is substantially less than that of tanks 32, 34.

The mixed liquor in the third tank 36 is effectively homogenously mixed by the directional and turbulent energy of the fluid jets from the gas-liquid contactors 40 in the tank 36, and a portion of this mixed liquor with a remaining $BOD_5$ of about 39 mg/liter is conducted to the final aeration treatment tank 38.

The final aeration treatment tank is provided with gas-liquid contactors of somewhat different design and which are provided with oxygen, rather than air, as the secondary gas stream.

The final tank oxygen supply system comprises at least one liquid oxygen storage tank, a vaporizer unit, and a larger jet gas-liquid contactor 42 than those used in tanks 32, 34, 36.

The gas-liquid contactors 42 are supplied with pressurized mixed liquor from the final tank 38 by means of suitable pumps, and maintain the final tank in an effectively homogenously mixed state. The gas-liquid contactor 42 is provided with a process oxygen supply rate of 9 pounds of oxygen per hour, and the tank has an oxygen uptake rate of about 22 pounds of oxygen per hour. Through the use of pure oxygen, the mixed liquor of the final tank 38 is further provided with a high dissolved oxygen content (DO) of about 6 mg/liter at design conditions, and the $BOD_5$ of the tank is maintained at less than 25 mg/liter.

Basin water depth, tank geometry, and pump and blower efficiencies are among the factors taken into account in determining jet gas-liquid contactor performance and component selection. [Shell, G. L., AWARE report, September, 1975] Atmospheric oxygen absorption efficiencies for tanks 32, 34, 36 in the range of 20 to 25 percent may be provided for medium depth basins using jet gas-liquid contactors such as those of the Pentech Division of Houdaille Industries, with oxygenation capacities of greater than 3 lbs. $O_2$/Bhp-hr.

In the case of high purity oxygen utilization in the final tank 38, the jet gas-liquid contactors provide greater than 90 percent absorption efficiencies (e.g., measured in tap water at standard conditions). Of course, the absorption efficiency will vary with water depth and vaporized liquid oxygen feed rate.

By utilizing the oxygen transfer models in conjunction with specific waste water parameters such as the oxygen transfer coefficient ($\alpha$), oxygen saturation coefficient ($\beta$), and waste water temperature, and accounting for site conditions such as elevation, and process conditions such as the amount of oxygen required for cell synthesis and endogenous respiration, organic loading rate, and residual dissolved oxygen required, the standard oxygen requirement can be calculated for a system such as that of FIGS. 2-4 of the drawings. A biological growth kinetic analysis may then be performed to insure that the system is not either growth or oxygen limited, which limits could possibly give an undesirable removal efficiency.

The oxygen uptake rate may be evaluated from kinetic coefficients determined for the waste water to be treated, in a manner based on the work of Eckenfelder and O'Connor [Eckenfelder, W. W., Jr., and D. J. O'Connor, *Biological Waste Treatment*, Pergamon, New York, 1961]. The amount of oxygen required for cell synthesis may be represented in the following manner:

$$\text{Substrate} + b\ O_2 \rightarrow \text{Cells} + CO_2 + H_2O) \qquad (1)$$

where

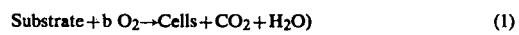

$$b = \frac{0.45\ \text{lbs}\ O_2\ \text{required}}{\text{lbs}\ BOD_5\ \text{removed}}$$

Similarly, the amount of oxygen required for endogenous respiration may be represented as:

$$\text{Cells} + a\ O_2\ CO_2 + H_2O + \text{oxidized form} \qquad (2)$$

where $$\text{Cells} + a\, O_2\, CO_2 + H_2O + \text{oxidized form} \quad (2)$$

$$\text{where } a = 1.42 \frac{\text{lbs } O_2 \text{ required}}{\text{lbs } VSS \text{ oxidized}}$$

The oxygen uptake rate, U, may be defined as the amount of oxygen required by the cells of the mixed liquor organisms in mg/l-day. Accordingly, the rate of oxygen uptake per day may be represented as:

$$U\forall = \frac{\text{lbs } O_2 \text{ uptake}}{\text{day}} = \frac{b\,[\text{substrate removed}] +}{a\,[\text{cells oxidized}]}$$

Where $\forall$ is the basin volume in cubic feet
Accordingly:

$$U\forall = bQ(S_0 - S_1) + a\, k_d \chi \forall \quad (3)$$

where:
Q is the waste water flow rate in ft$^3$/hour
$S_0$ is the influent substrate concentration in mg/liter
$S_1$ is the effluent substrate concentration in mg/liter
$K_d$ is the endogenous respiration coefficient
$\chi$ is the concentration of volatile suspended solids (VSS) in the basin.

Equation (3) may be simplified to provide representation of the oxygen uptake rate, U, as follows:

$$U = b \frac{Q}{\forall}(S_0 - S_1) + a\, k_d \chi \quad (4)$$
$$= b(S_0 - S_1)\frac{1}{\theta} + a\, k_d \chi$$

where $\theta$ is the hydraulic retention time ($= \forall/Q$). The substrate removal rate, q, may be shown to equal $(S_0 - S_1)/\chi\theta$, and by appropriate substitution in Equation (4), the oxygen uptake rate U may be further represented as:

$$U = b(S_0 - S_1)\frac{1}{\theta} + a\, k_d (S_0 - S_1)\frac{1}{q\theta} \quad (5)$$

which may be rewritten as follows for purposes of subsequent substitutions:

$$U = \frac{1}{\theta}(S_0 - S_1)\left[b + \frac{1}{q} a\, k_d\right] \quad (6)$$

By utilizing the Monod [Monod, J., "The Growth of Bacterial Cultures", *Annual Review of Microbiology*, 3, 371, 1949] growth equation, the substrate removal rate may be represented as:

$$q = \frac{\mu \max S_1}{Y(K_s + S_1)} \quad (7)$$

where:
$\mu$ max is the maximum specific growth rate of the cells
Y is the yield coefficient, and
$K_s$ is the Monod half-velocity coefficient By appropriate substitution of the Monod Equation (7), Equation (6) becomes $$U = \frac{Y(S_0 - S_1)(K_s + S_1)}{\theta \mu \max S_1}\left[a\, k_d + \frac{b\, \mu \max S_1}{Y(K_s + S_1)}\right] \quad (8)$$

Equation (8) may be used to calculate the expected oxygen uptake rate for a given substrate removal efficiency.

Substrate removal efficiency as a function of biological growth rate in the system may be similarly represented and quantified, such that the system can be provided which is not limited by cell growth for a required effluent quality. Such representation may be based on a conventional equation relating growth to the mean cell residence time, $\theta_c$:

$$1/\theta_c = \mu - k_d = Yq - k_d \quad (9)$$

where $\mu$ is the specific growth rate (and other parameters are as previously defined). Equation (9) may be further represented as:

$$1/\theta_c = QX_e/X\forall. \quad (10)$$

where $X_e$ is the amount of effluent solids from the secondary clarifier in mg/liter. Accordingly, $$QX_e = X\forall(Yq - k_d) \quad (11)$$

However, $$X = \frac{Q(S_0 - S_1)}{q} \quad (12)$$

Substituting Equation (12) and Equation (7) into Equation (11), a representation of the rate of the product of the flow rate Q and the effluent solids $X_e$ may be provided as:

$$QX_e = (YQ(S - S) - \frac{Q(S_0 - S_1)\, Y(K_s + S_1)k_d}{\mu \max S_1} \quad (13)$$

By taking the partial differential of the mass of solids exiting the system with respect to the effluent substrate concentration, setting this partial derivative equal to zero, and solving for the effluent concentration, the following expression is obtained:

$$S = \sqrt{\frac{k_d S_0 k_s}{\mu \max - k_d}} \quad (14)$$

Equation (14) may be shown to be a maxima of the function described by Equation (13) by taking the second parallel derivative as follows:

$$\frac{\partial^2(QX_e)}{\partial^2 S_1} = -2 \frac{Y k_d Q S_0 k_s}{\mu \max S_1^3} \quad (15)$$

As Equation (15) is less than zero, Equation (14) is shown to be a maxima value, and the system 10 is shown to be not limited by cell growth for a required effluent quality.

Various advantages which have been conventionally asserted in the art for using high purity oxygen for domestic waste water treatment include better liquid-solid separation in the final clarifier, reduced sludge production, and higher substrate removal rates. Such advantages are said to arise from the elevated dissolved oxygen (DO) levels, typically greater than 4 mg/liter, surrounding the floc.

The system 10 illustrated in FIGS. 2-4 is provided with eight flow trains 12, 13, 14, 15, 16, 17, 18, 19, each train comprising four completely mixed tanks in series flow connection, as shown in FIG. 3. Each of the first three tanks, or basins in each train is provided with a plurality of four jet gas-liquid contactors spaced equally on the floor of the basin. The contactors 40 utilize pressurized mixed liquor from their respective tank supplied by suitable recirculation pumps, as the motive fluid. Air supplied by centrifugal compressors is utilized as the secondary fluid. The mixed liquor and air flow rates through the contactors in the illustrated embodiment are optimally designed to transfer 500 pounds of standard oxygen per hour to each stage (2000 standard pounds of oxygen per hour per 4-stage tank) at an absorption efficiency exceeding 20%, which is adequate to treat design maximum monthly conditions of a $BOD_5$ loading of about 320 mg/liter of domestic waste water. The air flow rate may, however, be adjusted to supply a reduced amount of oxygen during lower demand periods, which can be monitored by measuring the residual DO in each tank basin. Such a reduced air compressor flow rate will decrease power consumption and increase absorption efficiency under reduced treatment conditions.

In four-tank trains, it will generally be desirable to have at least 50% of the influent $BOD_5$ consumed in the first influent tank, so that mixed liquor conducted from the first tank has less than 50% of the $BOD_5$ of the influent to the tank (under equilibrium conditions of constant influent flow rate and $BOD_5$). The initial tank in each train of the illustrated embodiment 10 are designed to remove at least about 50% of the $BOD_5$ of the influent flowing into the respective train through the use of atmospheric air as the oxygen source. The second tank receiving mixed liquor from the first tank should similarly be adapted to provide sufficient mixing, hydraulic retention time and atmospheric oxygen supply to remove at least 50% of the $BOD_5$ content of the mixed liquor conducted into the basin for the first tank, and the third tank should similarly be adapted to consume at least 50% of the $BOD_5$ content of the mixed liquor directed into the third tank from the second tank. Further, by the staged treatment of the aeration train in the illustrated embodiment 10, mixed liquor conducted from the third tank into the fourth tank is subjected to substantial mixing and aeration treatment pursuant to which at least 87.5% of the original $BOD_5$ has been removed by treatment with relatively inexpensive atmosheric air.

The final tank of each train is provided with one jet gas-liquid contactor 40 of the type used in the previous tanks of the respective train, which is supplied with atmosheric air as an oxygen source. The final tank is, however, further provided with an additional gas-liquid contactor 42 which is provided with substantially pure oxygen as the secondary fluid. The pure oxygen gas-liquid contactor 42 in the illustrated embodiment is larger than the atmospheric air contactors 40 and operates somewhat differently. In operation, vaporized liquid oxygen is injected into the liquid line and a variable speed pump is used to control the mixing intensity. The absorption efficiency of the oxygen provided by the contactors 42 is generally greater than 90%. In the illustrated embodiment 10, one to two tons of liquid oxygen are utilized and the utilization of oxygen is sufficient to elevate the DO concentration of the final train tanks to 6 mg/l during design flow conditions. Conventional jet gas-liquid contactor systems have for example, treated municipal waste water to an average effluent $BOD_5$ concentration of 26 mg/l while loaded at an organic loading rate of about 125 lbs/day-1000 cu. ft., and an average hydraulic detention time of 1.79 hours. The corresponding parameters of the illustrated system 10 are 140 lbs/day-1000 cu. ft. and 2.66 hours, respectively.

Accordingly, because the $BOD_5$ demand in the final tank is relatively small, a relatively high dissolved oxygen content may be maintained in the final tank through the use of a relatively small amount of pure oxygen.

Furthermore, in addition to the relatively high dissolved oxygen content of the mixed liquor in the final tank, a somewhat lower degree of tank mixing is provided in the final tank than in the preceeding tanks by virtue of the use of only a single atmospheric air gas-liquid contactor 40 and a single pure oxygen gas-liquid contactor 42 in the final tanks. The mixing intensity is still sufficient to maintain substantially homogenous dissolved oxygen content in the tank (particularly in view of the reduced level of biological oxygen demand) but provides an environment which is more conductive to the initiation of floc development than the preceeding tanks having lower DO content and higher mixing rates. In this connection, the mixing energy input to the final tank in the illustrated embodiment will generally be maintained at a level of about 50% of the mixing input of the respective preceeding tanks to the train.

The operation of the illustrated system may be more specifically described with reference to various kinetic parameters. In this connection, at average flow of 95 MGD, the hydraulic detention time in each tank basis is about 0.665 hours. By assuming other necessary kinetic coefficients for each tank and using these values to solve Equation (8), supra, the oxygen uptake rate can be estimated. This value can be compared to the amount of oxygen supplied to indicate whether the system may be oxygen limited. The assumed kinetic coefficients (typical values reported for domestic waste water) are:

$\mu$ max = 8 day$^{-1}$
$K_s$ = 100 mg/l
$Y$ = 0.8
50% $BOD_5$ removal in tanks 1, 2, and 3
36% $BOD_5$ removal in tank 4

The endogenous respiration rate, $k_d$, is varied for each tank since self consumption will increase as detention time in the system increases.

For the first tank 32, the endogenous respiration rate, $k_d$ may be assumed to be zero. This gives a substrate utilization rate of 1.2 day$^{-1}$. Solving Equation (8) yields an oxygen uptake rate of 230 lbs. $O_2$/hour. Similarly, by using $k_d$ values of 0.02 day$^{-1}$, 0.03 day$^{-1}$, and 0.05 day$^{-1}$ for the second, third, and fourth basins respectively, the specific growth rates and oxygen uptake rates are calculated to be: 0.76 day$^{-1}$ and 118 lbs. $O_2$/hour for the second tank 34, 0.38 day$^{-1}$ and 60 lbs. $O_2$/hour for the third tank 36, and 0.14 day$^{-1}$ and 22 lbs. $O_2$/hour for the final tank 38. Since in excess of 320 lbs. $O_2$/hour of actual oxygen are supplied to each tank in the illustrated embodiment, the system is not oxygen limited.

By taking a macroscopic view of the entire four-stage train, and using conservative literature values of kinetic coefficients (i.e., $\mu$ max = 8 day$^{-1}$, $k_s$ = 500 mg/l, $Y$ = 0.8, and $k_d$ = 0.03 day$^{-1}$) and an influent $BOD_5$ concentration of 314 mg/l; Equation (14) provides an effluent $BOD_5$ concentration of 25 mg/l. The actual concentration that will be achieved during operation of the system at any particular time will, of course, depend on actual growth rates and the efficiency of the final clarifier.

However, because Equation (14) is based on the efficiency of a single completely mixed tank, a plurality of serially arranged tanks as shown in the illustrated embodiment will provide a substantially more efficient process than indicated by Equation (14). [Levenspiel, O., *Chemical Reaction Engineering*, Wiley, New York, 1967]. Accordingly, it is apparent that the illustrated system is an efficient system that is neither oxygen nor growth limited.

Thus, the illustrated system will provide substantially the same degree of treatment as a conventional high purity oxygen system of the type illustrated in FIG. 1, with less than 10% of the high purity oxygen requirement and concomitant power and capital cost of cryogenic or other oxygen separation equipment and facilities. In this connection, the illustrated system 10 utilizes about 98% atmospheric oxygen and about two percent pure oxygen (in the form of vaporized liquid oxygen) as oxygen sources to give several marked advantages in the treatment of waste water. By using atmospheric oxygen for the predominant portion of the oxygen requirement, cryogenic plants, with their operational and maintenance requirements, may be eliminated. The use of vaporized liquid oxygen as a pure oxygen source for the final tank, with its high absorption efficiency, allows for a lower energy density in the final tank, and, accordingly, a better settling floc and higher effluent DO.

The power required by the illustrated system including the power utilized by the various compressors and pumps, is about 2770 kw or less at design conditions or 3404 kw or less at maximum monthly conditions for an illustrated basin water depth of 16.5 feet. A conventional high purity oxygen system such as illustrated in FIG. 1 would consume substantially higher amounts of power at such design conditions. Moreover, because the additional freeboard required by high purity oxygen systems is not necessary in the illustrated embodiment, the basin water depth may be increased to a higher level such as about 19.5 feet. Through the increased basin depth utilization permitted by the present system, the power required for the same amount of oxygen transfer may be reduced to a level of about 2500 kw or less at design conditions or about 2981 kw or less at maximum monthly conditions. The power savings effected by the illustrated treatment system over a comparable pure oxygen system at design conditions is about 603 kw for a 16.5 foot depth (allowing a 31 kw power equivalent for the purchase of liquid oxygen), or about 873 kw for a 19.5 foot basin depth.

Jet gas-liquid contactors of the type utilized in the system 10 have proven to be one of the most efficient oxygen transfer devices currently available, both in terms of transfer efficiency and power consumption. Accordingly, a lower operation cost is effected.

Accordingly, it will be appreciated that through the provision of the present invention, methods and apparatus are provided which represent improvements in waste water treatment systems, and in particular, systems utilizing pure oxygen and providing a treated mixed liquor effluent having a relatively high dissolved oxygen content.

While the present invention has been specifically described with respect to a specific embodiment, it will be appreciated that various modifications and adaptations may be made based on the present disclosure without departing from the spirit and scope of the present invention, and are intended to be included within the scope of the following claims.

For example, while the illustrated embodiment has trains comprising four serially arranged treatment tanks including a single final tank supplied with pure oxygen, other numbers of tanks may be provided such as eight serial complete mix tanks having two final oxygen supplied tanks. Furthermore, while the illustrated aeration basin embodiment has both air and oxygen supplied gas-liquid contactors in the final stages and is not covered, final stages may be provided which are supplied solely with relatively pure oxygen and/or air in which at least the final stages are covered. In this case, oxygen rich atmosphere from the final tanks may be recovered to the air intake of the compressors for the air supplied gas-liquid contactors.

Various of the features of the present invention are set forth in the following claims.

What is claimed is:

1. In a method of the activated sludge type for treating sewage in which raw or pretreated sewage influent to be treated is introduced into a series of staged aeration zones, mixed with recycled sludge and aerated in said zones, the improvement comprising the steps of
introducing said influent to be treated into a first zone of one or more sequentially connected initial aeration zones having a predetermined hydraulic volume corresponding to a predetermined hydraulic retention time under influent flow conditions of about 3.5 hours or less,
introducing air into said initial zones under conditions of high rate mixing as indicated by an energy dissipation rate E greater than about 100 horsepower per million gallons of volume of said initial zones and a mean velocity gradient $\bar{G}$ in said zones greater than about 100 seconds$^{-1}$ to provide an oxygenation intensity rate of at least 20 mg/1-hr in said initial aeration zones which is at least equal to the oxygen uptake rate within said initial treatment zones such that said initial treatment zones are not oxygen limited, and to reduce the $BOD_5$ of influent passing through said initial treatment zones by at least about 90% by effectively homogenous atmospheric oxygen aeration
conducting effluent from said initial treatment zones which retains less than about 10 percent of the $BOD_5$ of said influent to a final treatment oxygenation zone having a mean velocity gradient of no more than about 100 sec$^{-1}$ and an energy dissipation rate of less than about 60 horsepower per million gallons,
introducing substantially pure oxygen into said final treatment oxygenation zone and maintaining a dissolved oxygen content in said final treatment zone of at least about 3 mg/liter, said final treatment zone having a hydraulic retention time of from about 5 to about 35% of the total retention time of said staged aeration zones,
subjecting the effluent from said final treatment zone to a solids liquid separation step, returning at least a portion of the separated solids to said first treatment zone and discharging the clarified liquid to subsequent treatment or final discharge.

2. The method of claim 1 when said final treatment zone has 10% to 35% of the total hydraulic retention time of said staged aeration zones.

3. The method of claim 1 where said final treatment zone has a hydraulic retention time of from about 12 minutes to about 60 minutes.

4. The method of claim 1 wherein no more than 10% of the total oxygen requirement for all said zones is provided by high purity oxygen.

5. The method of claim 1 where at least 65% oxidation of incoming oxygen demanding load exerted within said aeration zones is satisfied in said first treatment zone.

6. The method of claim 1 wherein the energy dissipation rate is less than 60 Hp/MG in said final oxygenation zone.

7. A method of treating sewage of the activated sludge type, consisting of introducing raw or pretreated sewage into an aeration basin or tankage, mixing said basin or tankage, adding oxygen to said basin or tankage, at least 80% of said oxygen being in the form of atmospheric oxygen, said basin or tankage having at least two treatment zones comprising a first zone having a limited retention time such that an oxygen uptake rate U of at least 20 mg/liter-hour is exerted within said first treatment zone providing a specific oxygenation intensity V, in said first zone equal to or greater than the oxygen uptake rate within said first treatment zone such that said first treatment zone is not oxygen limited, and a final treatment zone having a mean velocity gradient, $\overline{G}_2 = \sqrt{P_2/V_2 u_2}$, of no more than 100 sec$^{-1}$ within said second or final treatment zone where $P_2$ = net power transferred to the liquid within the second treatment zone $V_2$ = volume of second treatment zone $u_2$ = dynamic viscosity of liquid in the second treatment zone subjecting the influent from said final treatment zone to a solids liquid separation step, returning at least a portion of the separated solids from said separation step to said first treatment zone and discharging the clarified liquid from said separation step.

8. The method of claim 7 when said final treatment zone has 10% to 35% of the total hydraulic retention time of said basin or tankage.

9. The method of claim 7 where said final treatment zone has a hydraulic retention time of 12 minutes to 60 minutes.

10. The method of claim 7 where said first treatment zone has a hydraulic retention time of 3.5 hours or less.

11. The method of claim 7 where the dissolved oxygen in said second or final treatment zone is maintained at 3 mg/liter or more.

12. The method of claim 11 where high purity oxygen is used in the final treatment zone to increase the oxygen transfer efficiency so that the mean velocity gradient, $\overline{G}$, is maintained below 100 sec$^{-1}$.

13. The method of claim 12 where no more than 10% of the total oxygen requirement for all zones is provided by high purity oxygen.

14. The method of claim 7 where at least 65% oxidation of incoming oxygen demanding load exerted within said basin or tankage is satisfied in said first treatment zone.

15. The method of claim 7 wherein said first treatment zone has a mean velocity gradient, $\overline{G}$, of greater than 100 sec$^{-1}$.

16. The method of claim 7 when the total energy dissipation rate, $E = P/V$, in said first treatment zone is greater than 100 Hp/MG and in the final treatment zone is less than 60 Hp/MG.

* * * * *